Nov. 26, 1929.    C. G. KING    1,737,375
ATTACHING MEANS FOR ARTICLES
Filed June 28, 1927    3 Sheets-Sheet 1
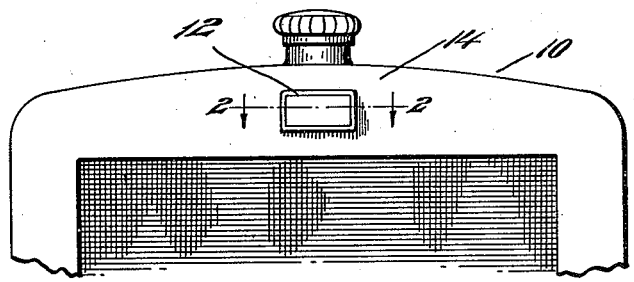
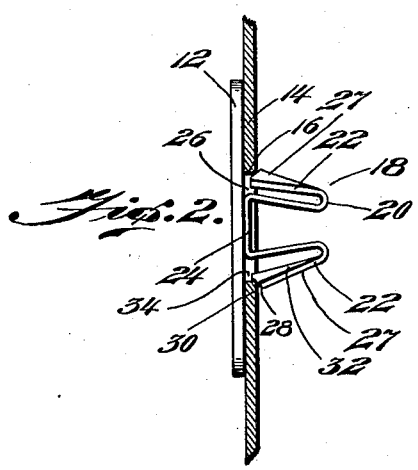
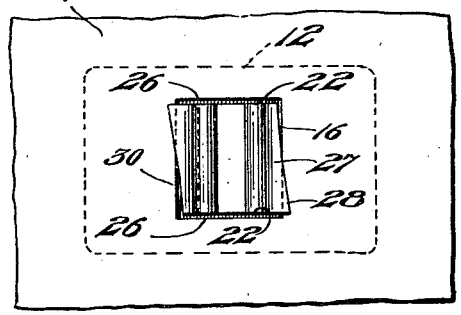
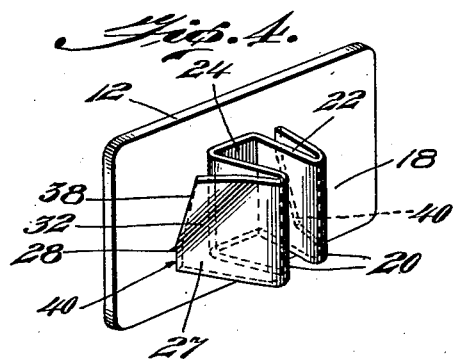
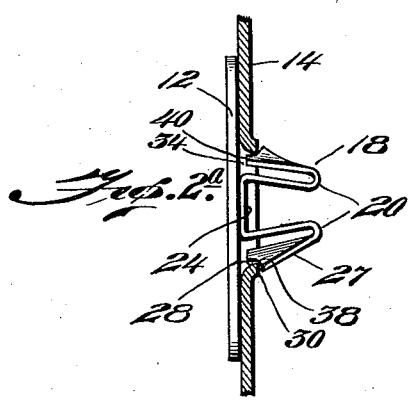
Inventor
Clifford G. King
By Thomas A. Jenckes Jr.
Attorney Nov. 26, 1929.                C. G. KING                 1,737,375
                      ATTACHING MEANS FOR ARTICLES
                  Filed June 28, 1927         3 Sheets-Sheet 2

Inventor
Clifford G. King
By Thomas A. Jenches Jr.
Attorney

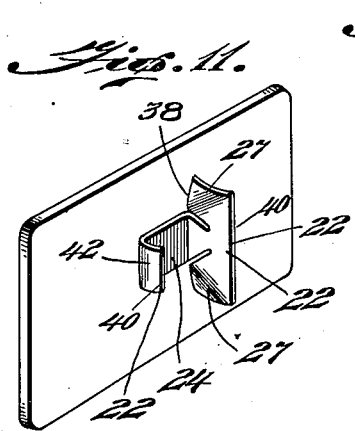
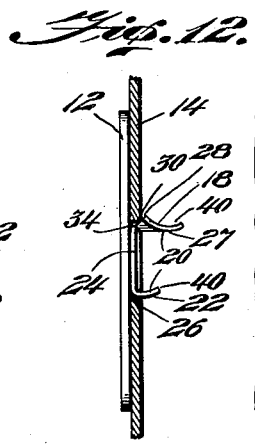
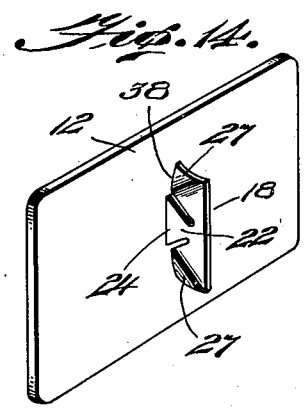
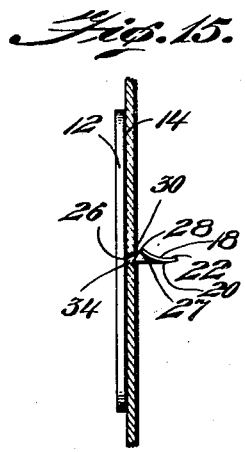
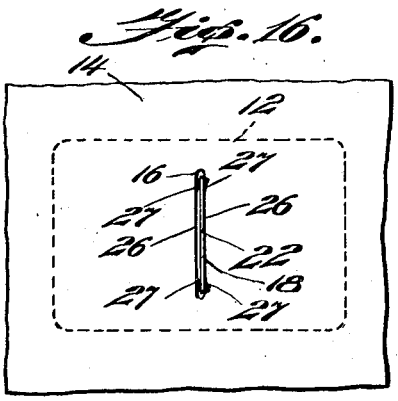
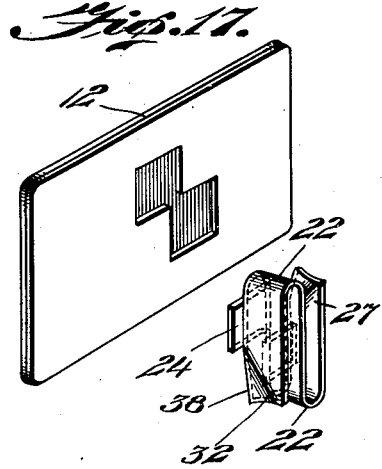
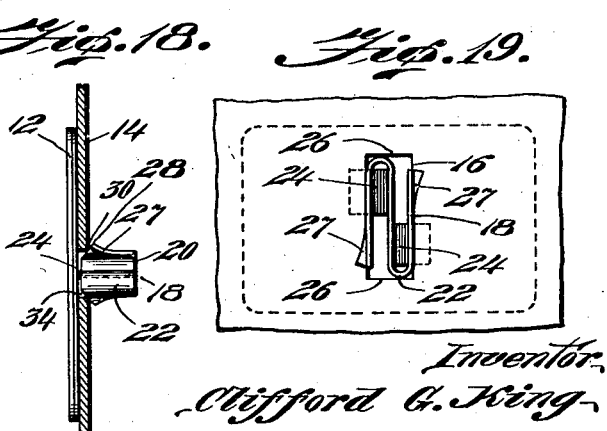

Patented Nov. 26, 1929

1,737,375

UNITED STATES PATENT OFFICE

CLIFFORD G. KING, OF PROVIDENCE, RHODE ISLAND

ATTACHING MEANS FOR ARTICLES

Application filed June 28, 1927. Serial No. 202,053.

My invention relates to a novel type of means for attaching a member to one side of a supporting wall having an aperture therein and is particularly adapted for securing name plates to automobile radiators.

While I am aware that others have provided attaching means for this purpose adapted to frictionally engage either the edges of the said aperture or portions projecting therefrom and also devices adapted to positively lock the name plate within the radiator, my invention presents novel features of construction which permit it to readily preferably both frictionally engage the edges of said aperture and also to positively lock the name plates thereto by a single locking edge.

My invention consists of the member to be attached and attaching means projecting at approximately right angles therefrom having an attaching portion having its base secured to said member and a locking portion integral with said attaching portion having a portion obliquely bent laterally from said attaching portion with the lower edge of said bent portion off-set from said member to cause the lower edge on insertion thereof to slip over a portion of the said supporting wall to bind against the side thereof to positively lock said member thereto. I believe I am the first to construct a simple device of this description where the lower edge of the locking portion of the attaching means is off-set from the member preferably the thickness of the supporting wall or the amount that any edge of the supporting wall may be bent inwards or outwards to cause a positive locking of the locking portion by having a portion of the obliquely bent portion thereof overlap the inner edge of the supporting wall. This as will be seen hereinafter from the description of various embodiments of my invention may be supplied in various specific forms thereof as will also the additional features about to be explained.

I also preferably construct the portion of the attaching means which is secured to said member so that it will project upward at approximate right angles from said member whereby the straight wall thereof may abut one or more edges of said aperture to keep said member in proper alignment at all times.

To aid in keeping said member in alignment I preferably form at least two sides of said attaching means so that they may abut opposing edges of said aperture to additionally bind said member thereto, thus achieving the result of the combination of a positive locking and frictional engagement of said member.

I further construct my attaching means so that the upper ends of the portions thereof which project through the aperture first on insertion therein are approximately the size of the aperture so that the attaching means may be readily inserted by merely sticking it within the aperture.

Although the locking portion may be merely bent from the attaching portion obliquely sidewise preferably arcuately, I preferably flare the locking portion downwardly and sidewise from the upper straight edge thereof to the lower edge thereof which as explained is off-set preferably the thickness of the supporting wall from said member to cause the resilient curvature necessary to cause the lower edge of the locking portion on insertion thereof to resiliently slip laterally over a portion of the supporting wall to bind against the side of said wall to cause the locking engagement heretofore referred to.

I also preferably bevel the lower edge of the obliquely bent locking portion upwardly toward the bent end thereof to permit said member to be attached to supporting walls of different thicknesses and to cause the edge thereof to come into unceasing contact with the side of the supporting wall adjacent to the aperture, even though the amount of curvature thereof may vary if the locking portion bends in use.

A further object of my invention is to provide said attaching means with a vertically resilient arm bent laterally and bevelled upwards on its aperture side engaging edge expanding laterally over said edge to provide a positive lock increasing in intensity and more firmly locking said member thereto on vibration of said supporting wall, thus providing I believe for the first time attaching means which will positively lock with increasing pressure in use.

A further object of my invention is to provide a device having one or all of the features hereinbefore referred to which is adapted to project through a single narrow slit in the supporting wall.

These and such other objects of my invention as may hereinafter appear, may be best understood from the description of the accompanying drawings which illustrate various embodiments thereof.

Figure 1 is a front elevation of the front of an automobile showing a name plate suitably attached to the radiator thereof.

Fig. 2 is a section taken along the line 2—2 thereof.

Fig. 2ª is a section of the embodiment of my invention shown in Fig. 2 employed on a radiator aperture having opposite side edges of the supporting wall bent slightly inwardly.

Fig. 3 is a rear elevation of the inside of the radiator with the embodiment of attaching means shown in Figs. 1 and 2 employed to attach the name plate thereto.

Fig. 4 is a rear perspective view of a name plate with the attaching means shown in Figures 1–3 affixed thereto.

Figure 5:
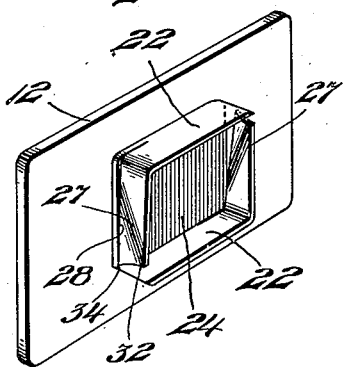

Fig. 5 is a rear perspective view of a name plate and a different form of attaching means.

Figure 6:
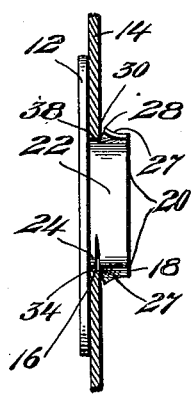

Fig. 6 is a sectional view thereof in attached position.

Figure 7:
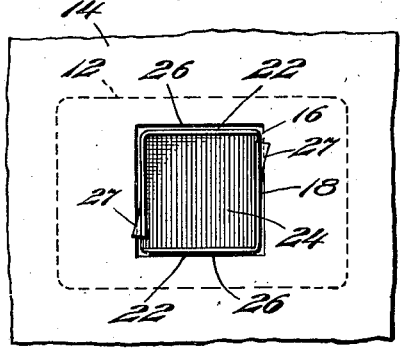

Fig. 7 is a rear elevation thereof in attached position.

Figure 8:
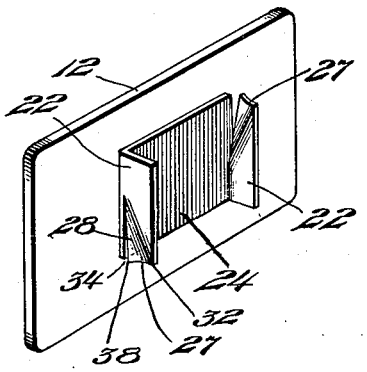

Fig. 8 is a rear perspective view of a name plate and a different form of attaching means.

Figure 9:
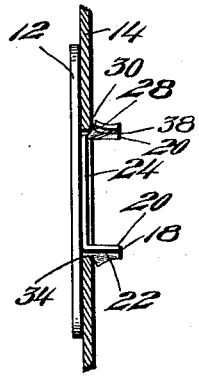

Fig. 9 is an end view thereof in attached position.

Figure 10:
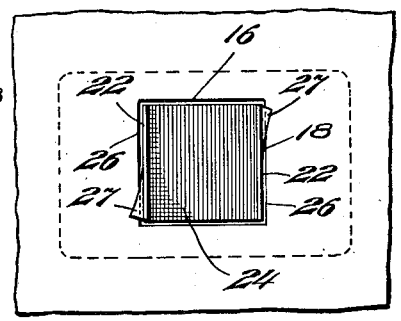

Fig. 10 is a rear elevation thereof in attached position.

Fig. 11 is a rear perspective view of a name plate and a different form of attaching means.

Fig. 12 is an end view thereof in attached position.

Fig. 13 is a rear elevation thereof in attached position.

Fig. 14 is a rear perspective view of a name plate and a different form of attaching means.

Fig. 15 is an end view thereof in attached position.

Fig. 16 is a rear elevation thereof in attached position.

Fig. 17 is a rear perspective view of a name plate and a different form of attaching means, with the attaching means separated from the name plate to better show its construction.

Fig. 18 is an end view thereof in attached position.

Fig. 19 is a rear elevation thereof in attached position.

In the drawings, wherein like characters of reference indicate like parts throughout, 10 generally indicates the front of an automobile having a name plate 12 suitably attached to the upper portion 14 of the radiator thereof. As usual, the front wall of the radiator acts as a supporting wall for the member 12 to which it is desired to be attached. The usual aperture 16 is made in the supporting wall 14. This aperture may take any desired type of shape but is preferably a right angled quadrilateral either square or rectangular. It may comprise as in the embodiment shown in Figures 15 to 16 the narrow slit 16.

As stated herein, the attaching means 18 may be of any suitable shape so long as it embodies the principles referred to and more particularly brought out in the claims but is preferably so shaped that the inner end 20 thereof is approximately the same size as the distance between at least two edges of the supporting walls of the aperture 16.

Said attaching means 18 is preferably constructed of metal bent to the desired configuration and preferably projects approximately at right angles from said member. As will become apparent, I preferably construct the attaching means 18 to have the aligning portion 22 project upward at approximate right angles from said member, having the base 24 thereof attached to said member 12, whereby the straight wall 22 thereof may abut an edge 26 of said aperture to keep said member in proper alignment therein. The aligning portion may comprise a single projection as in the embodiment shown in Figures 14 to 16 having both sides thereof abut opposite edges of the aperture 16, but in all the other embodiments shown different straight sides 22 abut opposing sides 26 of the aperture 16.

I preferably construct said attaching means with a locking portion 27 which bends at an angle obliquely laterally preferably arcuately, for the reasons to be described, with the free lower edge 28 thereof off-set substantially the thickness of an average supporting wall 16 from said member, to cause when the attaching means is inserted within the aperture a portion of the lower edge 28 thereof to spring over a portion of the wall 16 of said aperture to bind against the side 30 of said wall to positively lock said member 12 thereto. Although the locking portion may be obliquely bent or curved in any suitable manner from the aligning portion 22 in any manner so long as it is bent or curved obliquely, in the embodiment shown, in order that the attaching means may be more readily inserted within the aperture preferably the inner end 20 of said locking portion 27 is at substantially right angles to said member 12 to permit insertion of said member within said aperture, I preferably flare the locking portion 27 downwardly and laterally as at 32 towards the lower edge 28 thereof to give said locking portion 27 the desired curvature and yet as stated, to permit ready insertion of the attaching means within the aperture. As the locking portion 27 is resilient, as the attaching means is being inserted within the aperture 16 it is apparent that it will bend laterally until the locking edge 28 thereof is enabled to slip over the edge 16 of the aperture to bind the plate 12 thereto in the manner aforesaid. There is no objection however, if the locking portion 27 is merely bent or curved obliquely and the attaching portion instead of being downwardly and sidewise flared may be bent obliquely sidewise only on insertion thereof it will be necessary to compress the bent locking portion or otherwise suitably align it with the aperture and hold it compressed until the attaching means is inserted sufficiently within the aperture, to permit the portion of the lower edge 28 off-set as at 34 from the plate 12 the thickness of an average supporting wall 14 to spring over said wall.

A further feature of my invention consists in having the lower edge 28 of the locking portion 17 bevelled as at 38 preferably upwardly towards the bent end thereof. This I believe is an additional feature in devices of this description as it permits the member to be attached to supporting walls of different thicknesses and it permits the lower edge 28 thereof to come in unceasing contact with the side 30 of wall 16, even if the resiliency of the bent portion 27 may vary after the device is inserted, the bent or flared portion 27 curling outwardly or inwardly. The resilient edge 28 also acts as a wedge to assist the insertion of the attaching means, and causes it to bind the plate 12 thereto with increasing spring tension as the wall vibrates in use.

As stated, my invention may be constructed so as to have at least two sides 40 of the attaching means adapted to engage opposing edges 16 of said aperture to additionally frictionally bind said member 12 thereto. This is true in all the embodiments shown, except those shown in Figures 14 to 16. In the embodiment shown in Figures 1 to 4 the portions of the lower edges 28 of the locking portions 27 which are not curved are made straight for a distance to stretch outwardly against the edges 16 of the supporting wall 14 while the bevelled portions 38 thereof are suitably overlapping the sides 30 of the wall thereof. If desired, however, the embodiment shown in Figures 1 to 4 may be made without this frictional engagement feature. This frictional engagement feature may also be employed in any of the other embodiments shown by making the distance between the opposing sides of the attaching means substantially equal to the width of the aperture or by specifically constructing the unbeveled portions 40 of the lower edges 28 of the locking portions 27 substantially straight as shown in Figures 1 to 4.

The embodiment shown in Figures 1 to 4 has a W shaped attaching means which as explained functions both as a friction binder and to give a positive lock.

The attaching means shown in Figures 5 to 7 is square or rectangular and the aligning portions 22 thereof, comprise two opposite sides of the square and the locking portions 27 with the free off-set edges 28 comprise the other two opposite sides of the square.

The embodiment shown in Figures 8 to 10 is similar to the embodiment shown in Figs. 5 to 7 with the exception that the opposing flat sides 22 are omitted, the aligning portions 22 then becoming the straight edges 22 of the attaching means.

The embodiment shown in Figures 11 to 13 is similar to the embodiment shown in Figures 8 to 10 with the exception that there are two locking portions 27 one on each side of the aligning portion 22 and an additional aligning or frictional lug 42 is provided, spaced oppositely therefrom.

The embodiment shown in Figures 14 to 16 is very simple, and functions in a narrow slot 16 in the radiator 14, and a close inspection of this device will reveal that it may, if desired, have all the features hitherto explained. If desired one half of this device may be cut away, leaving only one resilient locking portion 27, which includes an attaching means into which all the features of my invention are embodied.

The embodiment shown in Figs. 17 to 19 consists of an S-shaped attaching means which embodies the features of my invention and is particularly inserted to illustrate the fact that the attaching means may be of any irregular shape provided it contains the essential features of my invention, such as the aligning portion 22 and the locking portion 27 which is preferably flared and beveled as in the other preferred embodiments.

As hitherto explained all that is necessary to do to attach is to insert the attaching means within the aperture, as the inner end 20 thereof is substantially of the same size or spaced substantially an amount about equal to the width of the aperture, on insertion thereof the resilient locking portion 27 bends inward until the off-set lower edge 28 thereof overlaps the side 30 of the aperture. As all embodiments of my invention form a positive lock, it is much more difficult to take them off, it being necessary for one to reach into the inside of the radiator to press the locking portions into desired alignment with the aperture for removal.

It is apparent that I have constructed a very simple type of attaching means for a name plate or other member to a supporting wall having an aperture therein which may be readily stamped or otherwise formed of resilient sheet stock.

It is understood that my invention is not limited to the specific embodiments shown and that various deviations may be made therefrom without departing from the spirit and scope of the appended claims.

What I claim as new and desire to secure by Letters Patent is:

1. Means for attaching a member to one side of a supporting wall having an aperture therein, comprising said member to be attached and attaching means therefor projecting at approximately right angles therefrom having an aligning portion including a straight wall having the base thereof attached to said member, whereby a portion of the straight wall thereof may abut an edge of said aperture to keep said member in proper alignment therein, said attaching means also having a locking portion having an upper edge also at approximate right angles to said member to permit ready insertion of said member within said aperture, flaring downwardly and laterally from said upper edge to the lower edge thereof with the lower edge thereof off-set substantially the thickness of an average supporting wall from said member to cause a portion of the lower edge on insertion thereof to spring over a portion of supporting wall to bind against the side of said wall to positively lock said member thereto, the lower edge thereof being beveled upwardly towards the bent end thereof to permit said member to be attached to supporting walls of different thicknesses and to come into unceasing contact with the side thereof, increasing in binding intensity on vibration of said wall, at least two sides of said attaching means being adapted to engage opposing edges of said aperture to additionally frictionally bind said member thereto.

2. Means for attaching a member to one side of a supporting wall having an aperture therein, comprising said member to be attached, and attaching means therefor projecting substantially at right angles therefrom, having an aligning portion including a straight wall projecting upwardly at approximately right angles from said member, having the base thereof attached to said member whereby the straight wall thereof may abut an edge of said aperture to keep said member in proper alignment therein, said attaching means also having a locking portion having an upper edge also approximately at right angles to said member to permit ready insertion of said member within said aperture and having its lower edge off-set from said member and a portion thereof flaring downwards and laterally from the upper to the lower edge thereof to cause a portion of the lower edge of said flaring portion on insertion thereof to spring over the supporting wall to bind against the side of said wall to positively lock said member thereto.

3. Means for attaching a member to one side of a supporting wall having an aperture therein, comprising said member to be attached and attaching means therefor projecting at approximately right angles therefrom having an aligning portion including a straight wall projecting upwardly at approximately right angles from said member having the base thereof attached to said member whereby the straight wall thereof may abut an edge of said aperture to keep said member in proper alignment therein, said attaching means also having a locking portion integral with said aligning portion having a portion bent obliquely laterally from the plane of said aligning portion and having its lower edge off-set from said member to cause the obliquely bent portion of the lower edge on insertion thereof to spring over a portion of supporting wall to bind against the side of said wall to positively lock said member thereto, at least two sides of said attaching means being adapted to engage opposing edges of said aperture to additionally frictionally bind said member thereto.

4. Means for attaching a member to one side of a supporting wall having an aperture therein, comprising said member to be attached and attaching means therefor projecting at approximately right angles therefrom, having an aligning portion including a straight wall projecting upwardly at approximate right angles from said member having the base thereof attached to said member, whereby the straight wall thereof may abut an edge of said aperture to keep said member in proper alignment therein, said attaching means also having a locking portion having an upper edge also at right angles to said member to permit ready insertion of said member within said aperture, and having its lower edge thereof off-set substantially the thickness of an average supporting wall from said member and a portion thereof flaring downwards and laterally from the upper to the lower edge thereof to cause the lower edge of said flaring portion on insertion thereof to spring over a portion of the supporting wall to bind against the side of said wall to positively lock the said member thereto, the lower edge of said flaring portion being bevelled upwardly towards the bent end thereof to permit said member to be attached to supporting walls of different thicknesses and to come in unceasing contact with the side thereof with increasing spring tension.

5. Means for attaching a member to one side of a supporting wall having an aperture therein, comprising said member to be attached and attaching means therefor projecting at approximately right angles therefrom having an aligning portion including a straight wall projecting upwardly at approximately right angles from said member having the base thereof attached to said member whereby the straight wall thereof may abut an edge of said aperture to keep said member in proper alignment therein, said attaching means also having a locking portion integral with said aligning portion having a portion bent obliquely laterally from the plane of said aligning portion and having its lower edge off-set substantially the thickness of the supporting wall from said member to cause at least a portion of the lower edge on insertion thereof to slip over a portion of the supporting wall to bind against the side of said wall to positively lock said member thereto.

6. Means for attaching a member to one side of a supporting wall having an aperture therein, comprising said member to be attached and attaching means therefor projecting at approximately right angles therefrom having a portion having its base secured to said member and a resilient locking portion having an upper edge approximately at right angles to said member to permit ready insertion of said member within said aperture, said locking portion flaring downwardly and laterally from said upper edge to the lower edge thereof with the lower edge thereof off-set substantially the thickness of an average supporting wall from said member to cause at least a portion of said lower edge to bind against the side of said wall to positively lock said member thereto, the lower edge thereof being bevelled upwardly toward the bent end thereof, to permit said member to be attached to supporting walls of different thicknesses and to come into unceasing contact with the side thereof with increasing tension, at least two sides of said attaching means being adapted to engage opposing edges of said aperture to additionally frictionally bind said member thereto.

7. Means for attaching a member to one side of a supporting wall having an aperture therein, comprising said member to be attached and attaching means therefor projecting at approximately right angles therefrom having an attaching portion having its base secured to said member and a locking portion integral with said attaching portion having a portion bent obliquely laterally from the plane of said attaching portion and having the lower edge of said bent portion off-set substantially the thickness of an average supporting wall from said member to cause the lower edge of said bent portion on insertion thereof to spring over a portion of the supporting wall to bind against the side of said wall, to positively lock said member thereto, the lower edge thereof being bevelled upwardly toward the bent end thereof to permit said member to be attached to supporting walls of different thicknesses and to come in unceasing contact with the side thereof with tension increasing on vibration of said wall.

8. Means for attaching a member to one side of a supporting wall having an aperture therein, comprising said member to be attached and attaching means therefor projecting at approximately right angles therefrom having an attaching portion having its base secured to said member and a locking portion integral with said attaching portion having a portion bent obliquely laterally from the plane of said attaching portion with the lower edge thereof off-set from said member to cause at least a portion of the lower edge on insertion thereof to spring over a portion of the supporting wall to bind against the side of said wall to positively lock said member thereto.

9. Means for attaching a member to one side of a supporting wall having an aperture therein, comprising said member to be attached and attaching means therefor comprising an arm extending therefrom having an integral resilient laterally expanding bevelled portion adapted to overlap the side of said wall to provide a positive and unceasing lock increasing on vibration of said wall.

10. Means for attaching a member to one side of a supporting wall having an aperture therein, comprising said member to be attached and attaching means therefor comprising an arm extending therefrom having an integral resilient bevelled portion adapted to overlap the side of said wall to provide a positive and unceasing lock increasing on vibration of said wall.

11. Means for attaching a member to one side of a supporting wall having an aperture therein, comprising said member to be attached and attaching means therefor comprising an arm extending therefrom having an integral resilient laterally obliquely bent expanding portion adapted to overlap the side of said wall to provide a positive and unceasing lock increasing on vibration of said wall.

12. Means for attaching a member to one side of a supporting wall having an aperture therein, comprising said member to be attached and attaching means therefor comprising a resilient arm extending therefrom having a portion bent obliquely sidewise to expand laterally over the edge of said wall, said portion having its lower edge bevelled upwards towards the bent end thereof to provide a positive lock increasing in its resilient pressure as said portion bends sidewise over the side of said wall and said attaching edge thus slides downwards on the bevel on vibration of said wall.

13. Means for attaching a member to one side of a supporting wall having an aperture therein comprising when in unattached position said member to be attached and attaching means therefor having an outer end of approximately the size of said aperture for insertion of said attaching means therein, said attaching means also having a portion extending integrally therefrom having a portion thereof laterally obliquely bent to overlap the side of said aperture and bind said member to said wall with increasing spring tension after insertion of said attaching means through said aperture.

14. Means for attaching a member to one side of a supporting wall having an aperture therein comprising when in unattached position said member to be attached and attaching means therefor having an outer end thereof approximately the size of said aperture for insertion thereof therein, said attaching means having a portion extending integrally therefrom offset from said member having a portion thereof laterally obliquely bent to overlap the side of said aperture and bind said member to said wall after the insertion of said attaching means through said aperture.

In testimony whereof I affix my signature.

CLIFFORD G. KING.